United States Patent
Hernandez et al.

(10) Patent No.: US 7,101,173 B2
(45) Date of Patent: Sep. 5, 2006

(54) PLUG SEALING DEVICE THAT IS NOT WELDED TO THE CHAMBER WALL

(75) Inventors: Didier Hernandez, Quiers (FR); Mario De Sousa, Cesson-la-Foret (FR); Patrice Commaret, Rubelles (FR)

(73) Assignee: Snecma Moteurs, Paris (FR)

( * ) Notice: Subject to any disclaimer, the term of this patent is extended or adjusted under 35 U.S.C. 154(b) by 50 days.

(21) Appl. No.: 10/870,051

(22) Filed: Jun. 18, 2004

(65) Prior Publication Data

US 2005/0028528 A1 Feb. 10, 2005

(30) Foreign Application Priority Data

Jun. 20, 2003 (FR) .................................. 03 07511

(51) Int. Cl.
*F23Q 7/06* (2006.01)

(52) U.S. Cl. ....................................... 431/258; 60/39.82

(58) Field of Classification Search ................ 431/258, 431/352, 154; 60/39.821, 752, 799, 800; 403/316

See application file for complete search history.

(56) References Cited

U.S. PATENT DOCUMENTS

| | | | | |
|---|---|---|---|---|
| 2,693,082 A | * | 11/1954 | Arthur | ..................... 60/39.827 |
| 3,990,834 A | * | 11/1976 | DuBell et al. | .............. 431/264 |
| 6,351,949 B1 | | 3/2002 | Rice et al. | |
| 6,499,993 B1 | * | 12/2002 | Steber et al. | ................ 431/352 |
| 6,557,350 B1 | * | 5/2003 | Farmer et al. | ................. 60/776 |
| 6,920,762 B1 | * | 7/2005 | Wells et al. | ................... 60/799 |

FOREIGN PATENT DOCUMENTS

| EP | 1 258 682 A2 | 11/2002 |
|---|---|---|
| GB | 1 402 540 | 8/1975 |

* cited by examiner

*Primary Examiner*—Alfred Basichas
(74) *Attorney, Agent, or Firm*—Oblon, Spivak, McClelland, Maier & Neustadt, P.C.

(57) ABSTRACT

The invention provides a combustion chamber comprising a chamber wall disposed radially inside a casing, an igniter plug for igniting the air-fuel mixture, the plug being mounted on said casing and comprising a body with a free end that is disposed in an opening formed through said chamber wall with a large amount of clearance to accommodate relative displacement between said casing and said chamber wall, and a sealing device provided between said body and the perimeter of said opening, said sealing device comprising an annular plug-guide through which said body passes, the plug-guide being slidably mounted at the radially-outer end of an annular support whose base is secured to said perimeter, wherein the support is secured to the radially-outer portion of a chimney passing through said opening and presenting at its radially-inner end a collar bearing against the inside face of the chamber wall, and wherein a cooling circuit for said collar is provided.

9 Claims, 2 Drawing Sheets

PLUG SEALING DEVICE THAT IS NOT WELDED TO THE CHAMBER WALL

The invention relates to a combustion chamber comprising a chamber wall disposed radially inside a casing, an igniter plug for igniting the air-fuel mixture, the plug being mounted on said casing and comprising a body with a free end that is disposed in an opening formed through said chamber wall with a large amount of clearance to accommodate relative displacement between said casing and said chamber wall, and a sealing device provided between said body and the perimeter of said opening, said sealing device comprising an annular plug-guide through which said body passes, the plug-guide being slidably mounted at the radially-outer end of an annular support whose base is secured to said perimeter.

BACKGROUND OF THE INVENTION

In conventional combustion chambers, the chamber wall is made of metal, and the support of the plug-guide is likewise made of a metal that is compatible with the metal of the chamber wall. The base of the support is welded to the outside face of the chamber wall around the opening.

With the increases in the temperature that exists within combustion chambers, where such increases in temperature are needed to improve the performance of aviation engines, it is no longer feasible to use chamber walls made of metal. This means that it is impossible for the plug-guide support to be welded to the chamber wall. This applies in particular when the chamber wall is made of a composite material comprising carbon fibers embedded in a ceramic matrix.

In its FIG. 2, U.S. Pat. No. 6,351,949 shows a combustion chamber of the type specified in the introduction above, in which the base of the support of the plug-guide appears to be fixed to the outside face of the chamber wall by welding around the opening. That document also shows removable means for introducing air into the combustion chamber, said means comprising a cylindrical sleeve passing through an orifice of the chamber wall and presenting a collar bearing against the inside face of the chamber wall, together with means for mechanically securing said sleeve disposed on the outside face of the chamber wall. The sleeve is made of a metal material that withstands high temperatures, and preferably of a ceramic material. That document does not suggest that the plug-guide could include a collar at its radially-inner end for fixing in the same manner against the chamber wall. Furthermore, it would be impossible to mount such a modified support since the plug-guide is held by an end portion of the support which is of a diameter greater than that of the base of said support, and the diameter of the opening is smaller than that of the collar and than that of the end portion.

OBJECT AND SUMMARY OF THE INVENTION

The object of the invention is to propose other means for fixing the plug-guide support to the chamber wall, and that is suitable for parts that are not mutually compatible or that have different coefficients of expansion.

In the combustion chamber of the invention, the support is secured to the radially-outer portion of a chimney passing through said opening and presenting at its radially-inner end a collar bearing against the inside face of the chamber wall, and there is provided a cooling-circuit for said collar.

The chimney can thus be made of a material that is different from the material of the chamber wall, and in particular it can be made out of a metal that is compatible with the metal of the support, given that a cooling circuit is provided.

Advantageously, the cooling circuit is implemented by fluting formed in the periphery of the chimney and on the face of the collar which bears against the wall of the chamber and by passages formed in the support and opening out into said fluting.

To facilitate mounting, the chimney presents at its periphery a finger that engages at least in a notch formed in the periphery of the opening.

This disposition makes it possible blindly to position the collar without error against the inside face of the chamber wall. This is particularly advantageous given that the curvature of the collar needs to match the curvature of the chamber wall.

Most advantageously, the support is secured to the outer portion of the chimney by welding.

In a first embodiment of the invention, the perimeter of the opening is clamped between the collar and the base of the support, said support surrounding the outer portion of the chimney.

The passages are then constituted by orifices passing through the wall of the support, and the base of the support presents a notch in which the end of the finger of the chimney is engaged.

This disposition makes it possible to position the support accurately on the chimneys so that the orifices open out into the fluting.

In a second embodiment of the invention, the chimney is fixed to the perimeter of the opening by means of a nut interposed between the chamber wall and the base of the support.

In which case, the passages are formed by slots formed in the base of the support.

BRIEF DESCRIPTION OF THE DRAWINGS

Other advantages and characteristics of the invention will appear on reading the following description given by way of example and made with reference to the accompanying drawings, in which.

MORE DETAILED DESCRIPTION

Figure 1:
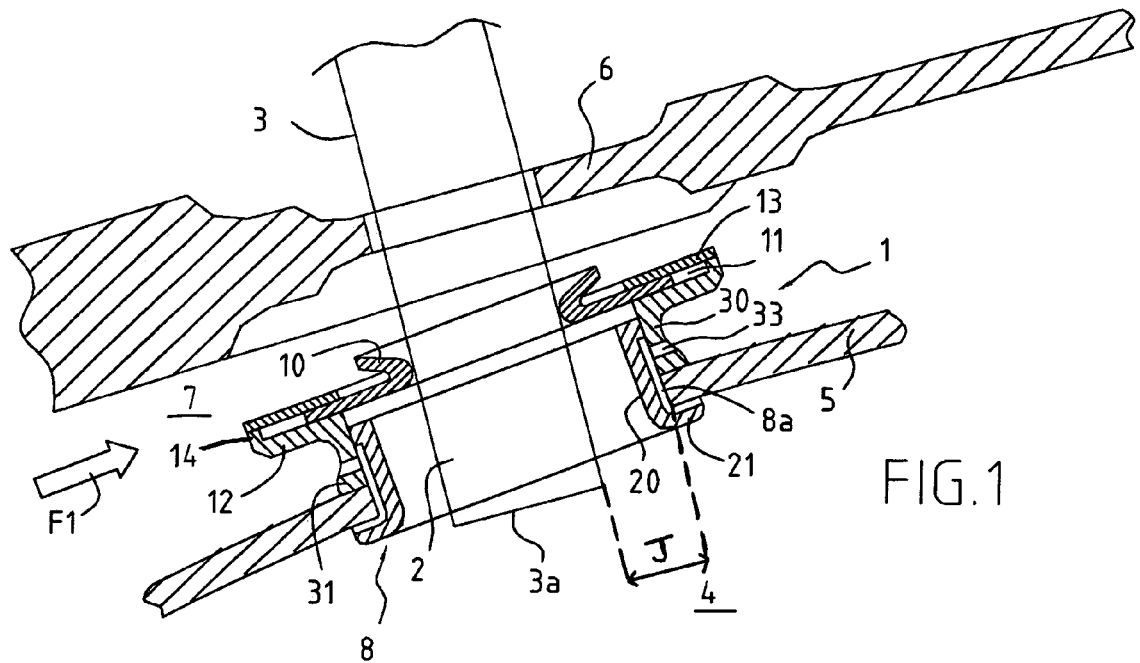
FIG. 1 is a fragmentary section view on a plane containing the axis of a combustion chamber including an igniter plug, with a sealing device constituting a first embodiment of the invention.
Figure 2:
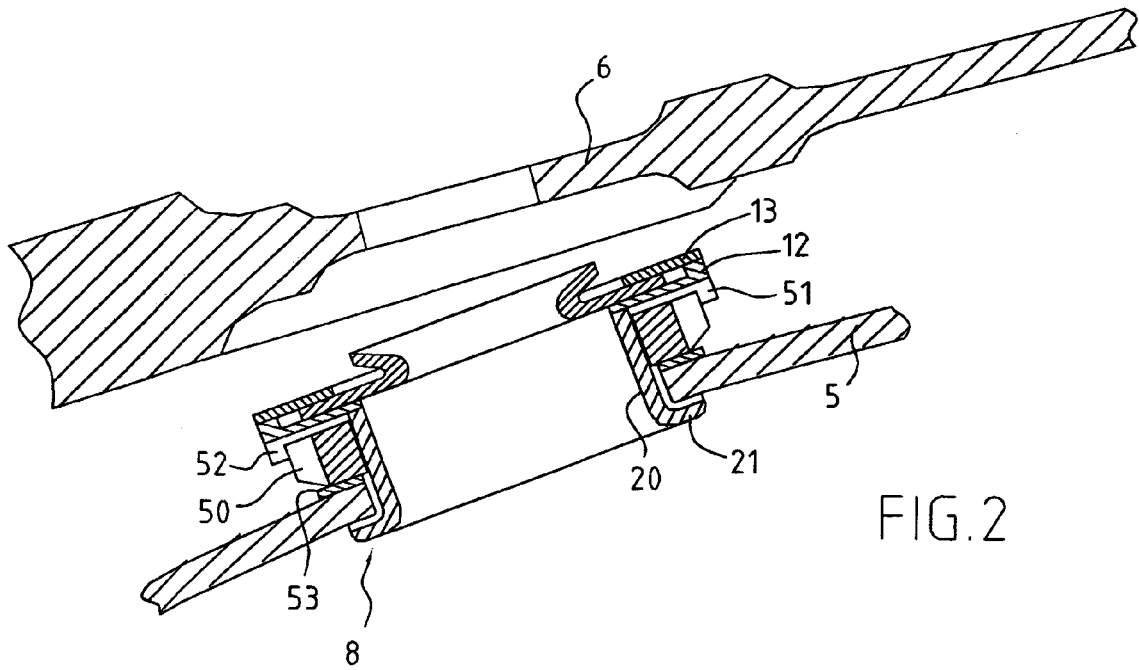
FIG. 2 shows a second embodiment of the sealing device of the invention.
Figure 3:
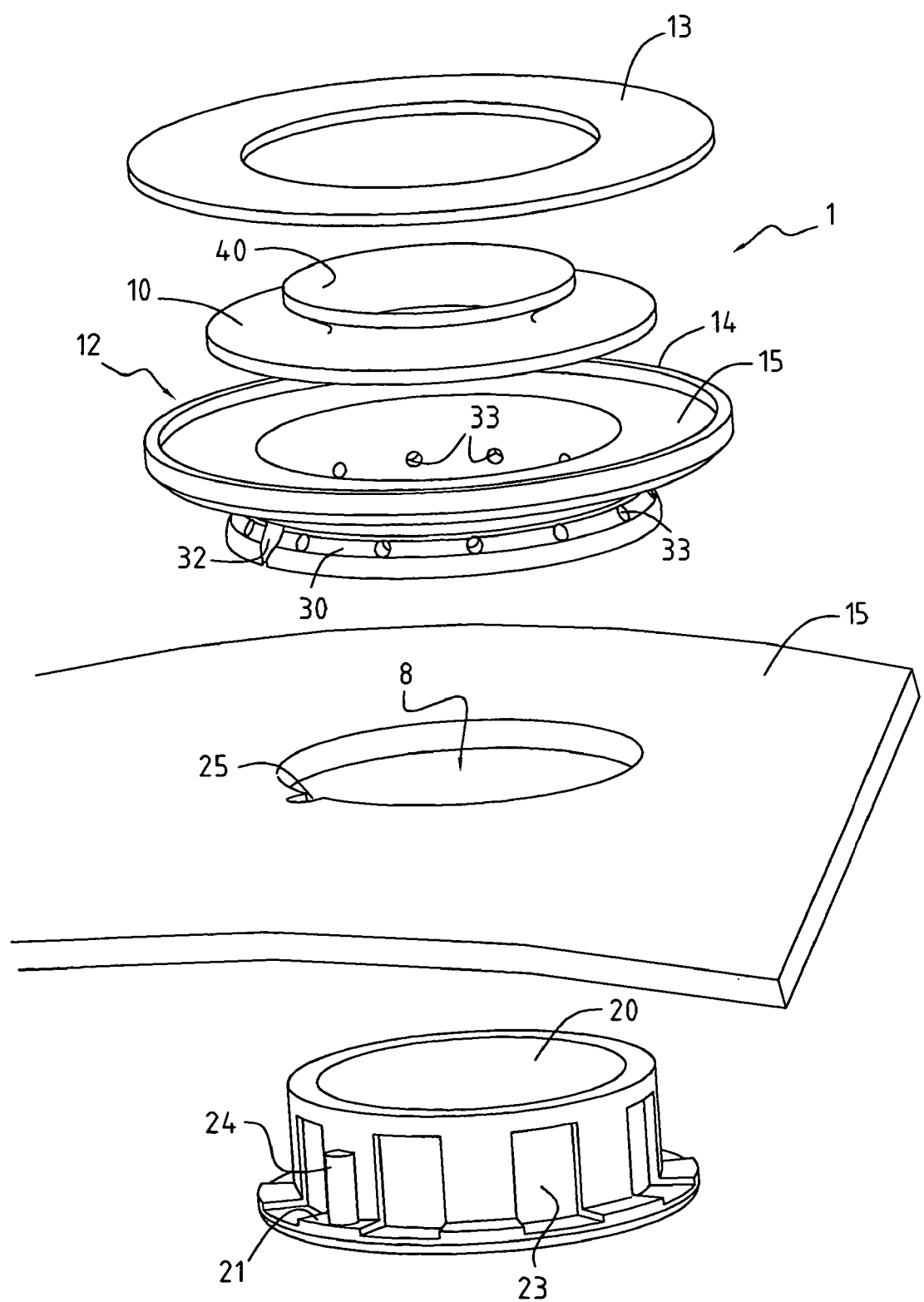
FIG. 3 is an exploded perspective view of the sealing device constituting the first embodiment of the invention.

FIGS. 1 to 3 show a sealing device 1 disposed between the body 2 of an igniter plug 3 for igniting the air fuel mixture in the enclosure 4 of a combustion chamber of axis X that is defined radially on the outside by a chamber wall 5 itself located inside a casing 6 carrying the plug 3. The casing 6 and the chamber wall 5 thus define between them an annular channel 7 in which there flows a flow of air F1 coming from the compressor and serving to cool the chamber wall, and possibly also to cool the casing and the turbine, and also to supply dilution air into the enclosure 4.

The radially-inner end 3a of the plug 3 is disposed with considerable clearance J in an opening 8 formed through the chamber wall 5. The clearance J is determined to be large enough to allow relative displacements between the casing 6 and the chamber wall 5 due to expansion.

The sealing device 1 comprises an annular plug-guide 10 surrounding the body 2 of the plug and made in the form of a disk that is slidably mounted in an annular housing 11 provided in the radially-outer portion of an annular support 12 secured to the perimeter 8a of the opening 8.

The annular housing 11 is defined by a cover 13 welded onto an annular bead 14 formed at the periphery of the top face 15 of the support 12. The height of the plug-guide 10 and the radial extent of the annular housing 11 relative to the axis of the plug are considerably greater than the diameter of the plug-guide 10 so as to leave it free to move in the housing during relative displacement between the plug and the chamber wall 5.

The support 12 of the plug-guide 10 is fixed, preferably by welding, to the radially-outer portion of a chimney 20 of diameter that matches that of the opening 8 and which presents at its radially-inner end a collar 21 for bearing against the inside face of the perimeter 8a of the opening 8.

As can be seen clearly in FIG. 3, the chimney 20 and the collar 21 present fluting 23 for receiving a flow of cooling air for cooling the chimney 20 and above all for cooling the collar 21 which is subjected to high temperatures since it is housed inside the enclosure 4 of the combustion chamber. In FIG. 3, it can also be seen that the base of the chimney 20 presents at its periphery a finger 24, while the perimeter 8a of the opening 8 presents a notch 25. The finger 24 is for engaging in the notch 25. This disposition ensures that the chimney 20 is mounted in the opening 8 in a predetermined angular position, so that the top face of the collar 21 presses accurately against the inside face of the perimeter 8a, this face of the collar being shaped as a function of the curvature of the wall of the chamber 5 around the opening 8.

The fluting 23 is regularly distributed around the periphery of the chimney 20, extending axially over substantially all of the height of the chimney 20 and extending radially over the face of the collar 21 that presses against the inside face of the chamber wall 5.

The fluting 23 is fed with cooling air by passages provided in the support 12.

In a first embodiment of the invention, shown in FIGS. 1 and 3, the support 12 comprises a sleeve 30 surrounding the chimney 20 and having a base 31 pressing against the outside face of the perimeter 8a, so that the perimeter 8a of the opening 8 is thus clamped between the collar 21 and the base 31.

As can be seen in FIG. 3, the base 31 of the support 12 also has a notch 32 in which the top end of the finger 24 is engaged. This disposition enables the support 12 to be positioned in a single angular position on the chimney 20, and also ensures that the chimney 20 is positioned in a single angular position in the opening 8.

The sleeve 30 presents ventilation orifices 33 which must open out in register with the fluting 23. Because the finger 24 is inserted in the notch 32, the orifices 33 are automatically positioned facing the fluting 23 on assembly, regardless of the distribution and the shape of the fluting 23, with this distribution and shape possibly being non-uniform and depending on zones that require more or less cooling.

It is easy to understand how the first embodiment of the sealing device 1 is mounted. The chimney 20 is placed in the opening 8, being inserted from the enclosure 4. The finger 24 co-operates with the notch 25 to define the angular position of the chimney 20. Thereafter, the support 12 is put into place on the chimney 20 from outside the chamber wall 5. Co-operation between the finger 24 and the notch 32 ensures that the support 12 is positioned angularly. The support 12 is then secured to the chimney 20 by welding. Thereafter, the plug-guide 10 is placed on the top face 15 of the support 12 and the cover 13 is secured to the bead 14 by welding. The plug-guide 10 is then free to move in the housing 11. The plug-guide 10 presents in its radially-outer zone a funnel 40 that flares radially outwards and that enables the plug-guide 10 to be positioned in the housing 11 while the plug 3 is being put into place on the casing 6.

FIG. 2 shows a second embodiment of the invention which differs from the first embodiment described above by the fact that the support 12 does not have a sleeve 30, the sleeve 30 being replaced by a nut having notches 50, that co-operate with a thread formed on the periphery of the chimney 20, the chimney nevertheless still presenting fluting 23 and a positioning finger 24.

The perimeter 8a of the opening 8 is clamped between the collar 21 and the nut 50. In this case, the support 12 is of small height and is secured to the radially-outer end of the chimney 20 by welding. The air for feeding the fluting 23 flows in the space between the support 12 and the top face of the nut 50. The bottom face of the support 12 may also present radial fluting. To control the flow rate of the air, the support 12 may present a peripheral bead 51 on its bottom face disposed around the nut 50 and having slots 52 formed therein for feeding the fluting 23. A resilient washer 53 may be interposed between the outside face of the periphery 8a and the nut 50 in order to accommodate the curvature of the chamber wall 5.

What is claimed is:

1. A combustion chamber comprising a chamber wall disposed radially inside a casing, an igniter plug for igniting the air-fuel mixture, the plug being mounted on said casing and comprising a body with a free end that is disposed in an opening formed through said chamber wall with a sufficient amount of clearance to accommodate relative displacement between said casing and said chamber wall, and a sealing device provided between said body and the perimeter of said opening, said sealing device comprising an annular plug-guide surrounding the body of the plug and including a disk that is slidably mounted in an annular housing provided in a radially outer portion of an annular support secured to said perimeter,
wherein the support is secured to the radially-outer portion of a chimney passing through said opening and presenting at its radially-inner end a collar bearing against the inside face of the chamber wall, and wherein a cooling circuit for said collar is provided.

2. A chamber according to claim 1, wherein the cooling circuit is implemented by fluting formed in the periphery of the chimney and on the face of the collar which bears against the wall of the chamber and by passages formed in the support and opening out into said fluting.

3. A chamber according to claim 2, wherein the chimney presents at its periphery a finger that engages at least in a notch formed in the periphery of the opening.

4. A chamber according to claim 3, wherein the support is secured to the outer portion of the chimney by welding.

5. A chamber according to claim 3, wherein the perimeter of the opening is clamped between the collar and the base of the support, said support surrounding the outer portion of the chimney.

6. A chamber according to claim 5, wherein the passages are constituted by orifices passing through the wall of the support.

7. A chamber according to claim 6, wherein the base of the support presents a notch in which the end of the finger of the chimney is engaged.

8. A chamber according to claim 3, wherein the chimney is fixed to the perimeter of the opening by a nut interposed between the chamber wall and the base of the support.

9. A chamber according to claim 8, wherein the passages are formed by slots formed in the base of the support.

* * * * *